UNITED STATES PATENT OFFICE.

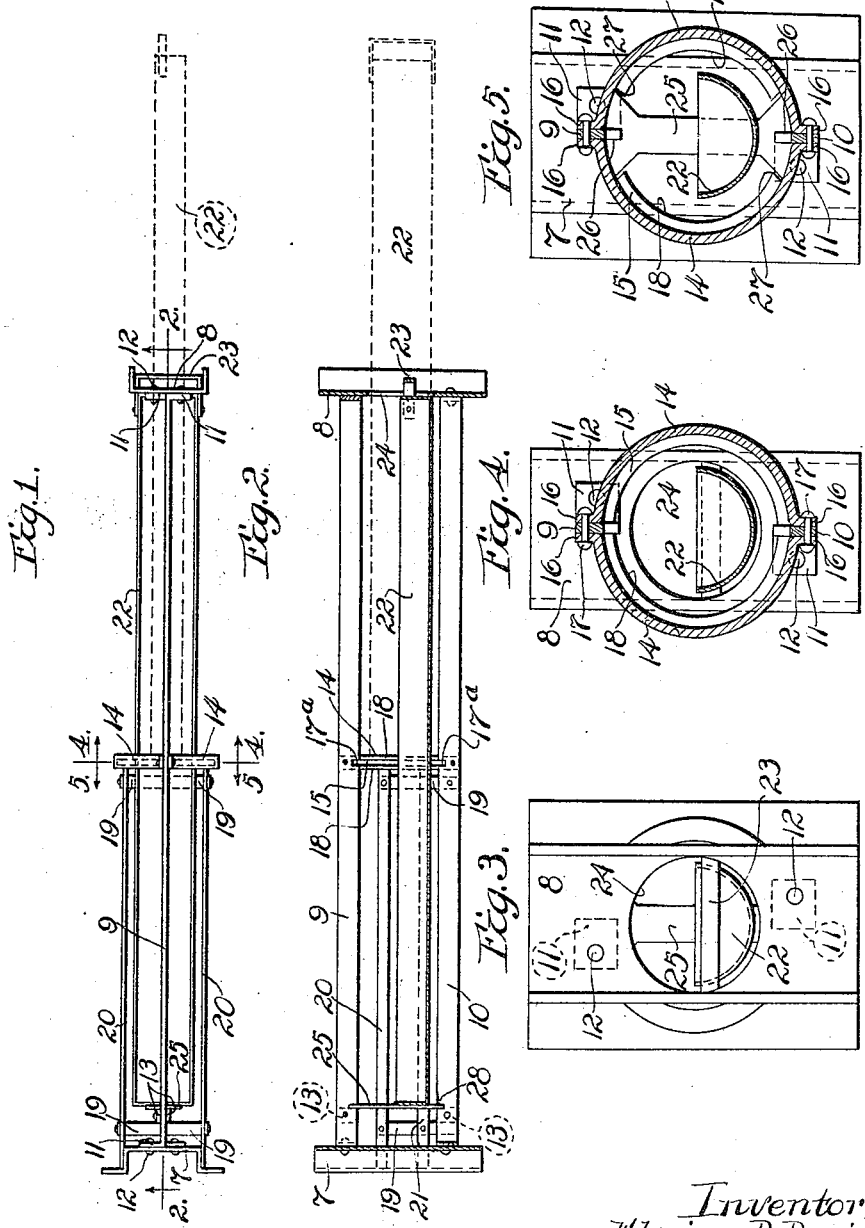
E. D. DAVIS.
WATER AND FEED TROUGH.
APPLICATION FILED OCT. 5, 1921.
1,410,536.
Patented Mar. 21, 1922.
Inventor,
Elnino D. Davis.

ELNINO D. DAVIS, OF CHICAGO, ILLINOIS, ASSIGNOR, BY MESNE ASSIGNMENTS, TO EQUIPMENT DEVICES COMPANY, A CORPORATION OF MAINE.

WATER AND FEED TROUGH.

1,410,536. Specification of Letters Patent. Patented Mar. 21, 1922.

Application filed October 5, 1921. Serial No. 505,590.

*To all whom it may concern:*

Be it known that I, ELNINO D. DAVIS, a citizen of the United States, a resident of Chicago, in the county of Cook and State of Illinois, have invented certain new and useful Improvements in Water and Feed Troughs, of which the following is a specification.

This invention relates generally to water and feed troughs, but particularly to improvements in that type of such troughs used in connection with the coops or compartments of cars used for shipping poultry of various kinds by rail, and it consists in certain peculiarities of the construction, novel arrangement and combination of the various parts thereof as will be hereinafter more fully set forth and specifically claimed.

As is well known to those familiar with the construction of poultry-shipping-cars, the coops or compartments thereof for the poultry, are arranged in superimposed tiers, side by side, along each side of the car with an aisle or passage-way between the inner or adjacent ends of the said tiers for the convenience of an attendant whose duty is to feed and water the poultry and to look after its welfare in other respects.

The principal object of the invention, is, the provision in one of the walls of a coop or compartment, of a slidable and rotatable or tiltable trough for water and feed, whereby it can be partially withdrawn from its supporting wall and tilted or inverted for the purpose of emptying and cleaning the same, and then turned to its receiving position, supplied with water or feed, and then returned to its initial or normal position without possibility of the poultry escaping from the coop, while the trough is extended from its supporting wall, and without danger of injury to the same when the trough is retracted.

Another object is to provide the trough with self-acting means for preventing accidental longitudinal movement or tiltable or rotary movement thereof.

Other objects and advantages of the invention will be disclosed in the following description and explanation.

In the accompanying drawing, which illustrates an embodiment of the invention, I have shown one of the side walls only of a rectangular shaped coop, equipped with my improvements, which is deemed sufficient, when taken in connection with the subjoined explanation for a full and clear understanding of the invention, which wall may be that of one of the divisional walls of the series of coops of a poultry-shipping car or one of the walls of an ordinary poultry yard coop.

Referring to the drawing:—

Fig. 1 represents a plan view of one of the walls of a poultry coop, showing the trough mounted on said wall and illustrating by dotted lines about the position to which the trough may be extended through one of the ends of the wall, said trough being shown as turned one-fourth of a revolution.

Fig. 2 is a longitudinal sectional view taken on line 2—2 of Fig. 1 looking in the direction indicated by the arrows, showing the trough by dotted lines extended from one end of the wall of the coop and as having been turned one-fourth of a revolution.

Fig. 3 is an end elevation of the inner end of the wall and trough mounted thereon.

Fig. 4 is a cross-sectional view taken on line 4—4 of Fig. 1, and

Fig. 5 is a similar view taken on line 5—5 of Fig. 1.

Corresponding numerals of reference refer to like parts throughout the different views of the drawing.

Referring now more particularly to Figs. 1 and 2 of the drawing, the reference numerals 7 and 8 designate respectively the outer and inner posts or uprights of one of the walls of a coop when the same is used in connection with a poultry-shipping car.

As shown, these posts are vertically channeled and by preference are made of channeled iron. They are spaced at any suitable distance apart and are united by a pair of horizontally disposed slats 9 and 10, which are also preferably of metal. These slats are located in parallelism with one another at a suitable distance apart and are secured to the adjacent surfaces of the posts 7 and 8 about midway between the sides of said posts. For the purpose of securing the slats 9 and 10 to the posts 7 and 8, each of said slats is provided at its ends with laterally disposed flanges 11 which are fastened to the posts 7 and 8 by bolts or rivets 12 extended through suitable openings in said members. Near one of its ends, each of the slats 9 and 10 is provided with a transversely disposed projection 13 to act as stops against the longitudinal movement of the trough in one direction as will be presently explained.

About midway between the posts 7 and 8 the slats 9 and 10 have mounted on their opposite sides a semi-circular casting 14 each of which castings is provided on its inner surface with a channel 15 most clearly shown in Fig. 2 of the drawing. Each of the castings or members 14 is provided at each of its ends with an apertured lug or flange 16 for the reception of fastening devices 17 employed for securing them to the slats 9 and 10 in such a way that their grooves or channels 15 will coincide with one another.

By reference to Fig. 2 it will be seen and understood that each of the slats 9 and 10 is provided with a cutaway portion 17ª in its edge adjacent the channels 15 of the castings or members 14, thus affording a circular and unbroken passage-way 15 between the internal flanges 18 of the members 14. Secured to and on each side of the lower slat 10 near the post 7, is a laterally and upwardly curved bracket 19 to the outer surface of each of which is secured near one of their ends a pair or a plurality of slats 20 and 21 which are horizontally disposed and spaced one above the other as shown in Fig. 2 of the drawing. These slats are secured near their opposite ends to laterally and upwardly curved brackets 19 one of which is mounted on each side of the lower slat 10 of the wall of the coop near the guide ring or channeled members 14 as will be readily understood by reference to Figs. 1 and 2 of the drawing.

By this arrangement it is apparent that the slats 20 and 21 supported on each side of the lower slat 10 of the wall will be spaced outwardly from said slat, thus affording ample space between the upper pair of slats 20 and the lower pair of slats 21 for the location of the trough 22 which is preferably made of metal and substantially semi-circular in cross-section as is clearly shown in Figs. 3 to 5 inclusive of the drawing. The trough 22 is of sufficient length to extend from the inner surfaces of the stop members 13 to the inner surface of the post 8, without binding when so located. That end of the trough 22 adjacent the post 8 is provided with a transversely disposed handle 23, which, when the trough is in the position shown by continuous lines in Figs. 1 and 2, projects outwardly from the trough through a circular opening 24 in the post 8. The lower portion or edge of this opening 24 extends slightly above the lower part of the perimeter of that end of the trough adjacent said post, that is, when the trough is in its normal position as shown by continuous lines in Fig. 2. The opposite end of the trough has mounted thereon a vertically disposed guide-arm 25, in the upper and lower ends of which is provided with a vertically disposed slot 26 to engage the upper and lower rails 9 and 10 of the wall of the coop.

As is clearly shown in Fig. 5 of the drawing, this guide-arm is laterally widened at each of its ends so as to coact with the flanges 18 of the castings or members 14 between which flanges the widened portions of the guide-arm are adapted to operate when the trough is extended to the dotted line positions shown in Figs. 1 and 2 of the drawing, and it is desired to tilt or turn the trough for the purpose of emptying the same.

In order to admit of the passage of the widened ends of the guide-arm 25 into the channel of said castings or members, the flanges 18 thereof adjacent the guide-arm, are formed with cut-away portions 27, see Fig. 5, which portions are located diametrically opposite each other as shown, and will permit the ends of the guide-arm to pass therethrough until they strike the flanges 18 on the opposite side of the members 14, when it is apparent further outward movement of the trough will be prevented by the last named flanges. When in this position, the trough may be turned on its longitudinal axis so as to empty the contents thereof, and can then be righted or returned to its position for receiving and holding water or feed, when, after the same has been supplied thereto, the trough can be returned to its normal position as shown by continuous lines in Fig. 2 of the drawing. In this last named movement of the trough, the lower end of the guide-arm 25 will coact with the notch 28 in the upper edge of the lower slat 10 near the post 7 so as to assist in preventing longitudinal movement of the trough from the last named post. This notch 28 has an inclined edge upon which the lower end of the guide-arm will ride when the trough is drawn outwardly through the opening 24 of the post 7, which can be done by lifting that end of the trough adjacent the post 8 slightly so as to disengage its adjacent end from the lower portion of the opening 24 in said post.

From the foregoing, and by reference to the drawing, it will be readily understood and clearly seen that the slats 9 and 10 are so spaced with respect to the trough and themselves as to prevent the poultry escaping through said spaces. It is also manifest that the slats 20 and 21 supported on each side of the slat 10, will prevent the passage of poultry between the slats 9 and 10 when the trough is extended to the dotted line position in Figs. 1 and 2 for the purpose of emptying the trough or supplying material thereto.

As before stated, my improvements are particularly adapted for use in connection with the coops or compartments of poultry-shipping cars, and when so used, it is manifest that the troughs can be extended into the aisle or passage-way between the tiers or rows of coops for the purpose of emptying or filling the same, but I desire it to be understood that I do not wish to be limited to such coops in the application of my device, but may employ it in connection with ordinary domestic coops or wherever found practical, without departing from the spirit of the invention.

By providing the slats 9 and 10 with the stop members 13 located at a slight distance inwardly from the post 7 or outer post, it is manifest that these stops, as well as the notch 28 in the lower slat, will prevent the trough being moved close enough to the post 7 to catch between its adjacent end the heads of poultry which might be interposed between the slats of the wall of the coop near said post in an effort to escape from the coop or in an endeavor to obtain feed or grain on the floor of the coop.

Having thus fully described my invention, what I claim as new and desire to secure by Letters Patent is—

1. In a water and feed trough, the combination with a horizontally slatted wall of a coop, of a trough mounted thereon between a pair of the slats thereof for restricted longitudinal movement and for rotary movement when partially extended from one end of said wall, means carried by the trough and coacting with the slats between which it is located to normally hold the trough with its opening disposed upwardly, and guiding means transversely mounted on said wall between its ends for the reception and guidance of the first named means for the purpose of permitting the trough to be rotated and for the purpose of restricting its longitudinal movement in one direction.

2. In a water and feed trough, the combination with a support including a pair of spaced parallel slats and a uniting support for each of the ends thereof one of said supports having an opening between said slats, of a circular internally channeled guiding ring transversely mounted on said slats between their ends and having a recess at each of the slats in one of the walls of its channel, each of said slats having a recess coinciding with the said channel, a trough located between the slats and adapted to be slid through said opening in one of said end supports, and a guide-arm carried by the trough and having slots in its ends to engage the slats between which the trough is located.

3. In a water and feed trough, the combination with a horizontally slatted wall of a coop, of an upright support uniting said slats at each of their ends and one of said supports having an opening between a pair of said slats, a trough horizontally located between said pair of said slats and adapted for slidable movement through said opening, of a circular internally channeled guiding ring transversely mounted on said slats about midway between their ends and having a recess at each of the slats in the wall of its channel opposite the opening of said support, each of said slats having a recess coinciding with the said channel, a guide-arm vertically mounted on the trough at its end opposite the end thereof adjacent the opening of said support, said arm having in each of its ends an open slot for engagement with the slats between which the trough is located and for co-operative engagement with the channeled guiding ring to permit rotary movement of the trough and to restrict its longitudinal movement in one direction.

4. In a water and feed trough, the combination with a horizontally slatted wall of a coop, of an upright support uniting said slats at each of their ends and one of said supports having an opening between a pair of said slats, a trough horizontally located between the said pair of slats and adapted for slidable movement through said opening, of a circular internally channeled guiding ring transversely mounted on said slats between their ends and having a recess at each of the slats in the wall of its channel opposite the opening of said support, each of said slats having a recess coinciding with the said channel and the lower one of said slats having near one of its ends in its upper edge a depending notch, a guide-arm vertically mounted on the trough at its end adjacent said notch, said arm having in each of its ends on open slot for engagement with the slats between which the trough is located and for co-operative action with the channeled guiding ring to permit rotary movement of the trough and to restrict its longitudinal movement in one direction, and a slatted frame mounted on each side of the lower slat near one of its ends and outwardly of the trough.

ELNINO D. DAVIS.